(12) United States Patent
Bhandari et al.

(10) Patent No.: US 11,036,541 B2
(45) Date of Patent: Jun. 15, 2021

(54) INTERRUPT MANAGEMENT FOR A HYPERVISOR

(71) Applicant: Microsoft Technology Licensing, LLC, Redmond, WA (US)

(72) Inventors: Aditya Bhandari, Seattle, WA (US); Bruce J. Sherwin, Jr., Woodinville, WA (US); Xin David Zhang, Redmond, WA (US)

(73) Assignee: Microsoft Technology Licensing, LLC, Redmnd, WA (US)

( * ) Notice: Subject to any disclaimer, the term of this patent is extended or adjusted under 35 U.S.C. 154(b) by 0 days.

(21) Appl. No.: 15/875,873

(22) Filed: Jan. 19, 2018

(65) Prior Publication Data
US 2019/0087223 A1 Mar. 21, 2019

Related U.S. Application Data

(60) Provisional application No. 62/560,557, filed on Sep. 19, 2017.

(51) Int. Cl.
*G06F 9/48* (2006.01)
*G06F 9/455* (2018.01)
*G06F 9/50* (2006.01)

(52) U.S. Cl.
CPC ........ *G06F 9/4818* (2013.01); *G06F 9/45558* (2013.01); *G06F 9/4812* (2013.01);
(Continued)

(58) Field of Classification Search
CPC .. G06F 9/4818; G06F 9/4812; G06F 9/45533; G06F 9/5038; G06F 9/505;
(Continued)

(56) References Cited

U.S. PATENT DOCUMENTS 5,892,956 A * 4/1999 Qureshi ................. G06F 13/26
710/260
7,222,203 B2 * 5/2007 Madukkarumukumana ................
G06F 9/45533
710/260
(Continued)

FOREIGN PATENT DOCUMENTS

EP 1804164 A1 7/2007
WO 2014188155 A1 11/2014

OTHER PUBLICATIONS

"International Search Report and Written Opinion Issued in PCT Application No. PCT/US2018/038877", dated Sep. 11, 2018, 14 Pages.
(Continued)

*Primary Examiner* — Benjamin C Wu

(57) ABSTRACT

This disclosure generally relates to enabling a hypervisor of a host machine to provide virtual interrupts to select virtual processors or a set of virtual processors. More specifically, the present disclosure describes how a hypervisor of a host machine may monitor the status of one or more virtual processors that are executing on the host machine and deliver interrupts to the virtual processors based on a number of factors including, but not limited to, a priority of the interrupt, a priority of the virtual processor, a current workload of the virtual processor and so on.

20 Claims, 12 Drawing Sheets

(52) U.S. Cl.
CPC ............ *G06F 9/505* (2013.01); *G06F 9/5038* (2013.01); *G06F 2009/4557* (2013.01); *G06F 2009/45575* (2013.01); *G06F 2009/45579* (2013.01); *G06F 2009/45591* (2013.01)

(58) Field of Classification Search
CPC ......... G06F 9/45558; G06F 2009/4557; G06F 2009/45575; G06F 2009/45591
See application file for complete search history.

(56) References Cited

U.S. PATENT DOCUMENTS

| | | | | |
|---|---|---|---|---|
| 7,533,207 | B2* | 5/2009 | Traut | G06F 9/45533 710/260 |
| 7,581,052 | B1* | 8/2009 | Solomita | G06F 9/4812 710/260 |
| 7,590,982 | B1* | 9/2009 | Weissman | G06F 9/4812 710/260 |
| 7,707,341 | B1* | 4/2010 | Klaiber | G06F 9/45533 710/244 |
| 8,286,162 | B2* | 10/2012 | Neiger | G06F 9/4812 718/1 |
| 8,489,789 | B2* | 7/2013 | Serebrin | G06F 13/24 710/267 |
| 2004/0215860 | A1* | 10/2004 | Armstrong | G06F 13/24 710/260 |
| 2006/0136653 | A1 | 6/2006 | Traut et al. | |
| 2008/0141277 | A1* | 6/2008 | Traut | G06F 9/4812 719/313 |
| 2008/0195785 | A1* | 8/2008 | Herczog | G06F 9/4818 710/264 |
| 2008/0229315 | A1* | 9/2008 | Yoshida | G06F 9/466 718/102 |
| 2009/0070510 | A1* | 3/2009 | Crossland | G06F 13/24 710/266 |
| 2010/0049892 | A1 | 2/2010 | Schwarz et al. | |
| 2010/0174886 | A1* | 7/2010 | Kimelman | G06F 9/4818 712/28 |
| 2010/0274941 | A1* | 10/2010 | Wolfe | G06F 9/5033 710/269 |
| 2011/0202699 | A1 | 8/2011 | Van Riel | |
| 2014/0047150 | A1 | 2/2014 | Marietta et al. | |
| 2014/0310704 | A1 | 10/2014 | Cantu | |
| 2015/0019765 | A1* | 1/2015 | Kegel | G06F 13/24 710/48 |
| 2015/0205736 | A1* | 7/2015 | Neiger | G06F 9/45533 710/269 |
| 2015/0212956 | A1 | 7/2015 | Tsirkin et al. | |
| 2016/0224362 | A1 | 8/2016 | Tsirkin et al. | |
| 2016/0364267 | A1* | 12/2016 | Varadarajan | G06F 9/4881 |
| 2016/0378698 | A1* | 12/2016 | Malalangaradass | G06F 13/26 710/264 |
| 2019/0050356 | A1* | 2/2019 | Hellwig | G06F 13/34 |
| 2019/0087222 | A1 | 3/2019 | Bhandari et al. | |
| 2020/0125397 | A1* | 4/2020 | Wu | G06F 9/45558 |

OTHER PUBLICATIONS

"International Search Report and Written Opinion Issued in PCT Application No. PCT/US2018/038884", dated Sep. 11, 2018, 13 Pages.

"Non Final Office Action Issued in U.S. Appl. No. 15/875,840", dated May 31, 2019, 10 Pages.

"Non-Final Office Action Issued in U.S. Appl. No. 15/875,840", dated Apr. 2, 2020, 11 Pages.

"Final Office Action Issued in U.S. Appl. No. 15/875,840", dated Nov. 1, 2019, 12 Pages.

"Non-Final Office Action Issued in U.S. Appl. No. 15/875,840", dated Dec. 10, 2020, 12 Pages.

"Final Office Action Issued in U.S. Appl. No. 15/875,840", dated Sep. 2, 2020, 14 Pages.

* cited by examiner

INTERRUPT MANAGEMENT FOR A HYPERVISOR

CROSS-REFERENCE TO RELATED APPLICATIONS

This application claims priority to U.S. Provisional Patent Application No. 62/560,557 entitled, "Interrupt Management for a Hypervisor" and filed on Sep. 19, 2017, the entire disclosure of which is hereby incorporated by reference in its entirety.

BACKGROUND

In current computing systems, an interrupt, issued by hardware or software, is used to notify a processor that a particular event needs action and/or that a particular bit of work needs to be done. When the interrupt is received by the processor, the processor may suspend its current activities, and perform one or more actions specified in the interrupt. Once the interrupt has been handled, the processor may resume its other activities.

In a virtual computing system, a hypervisor may be configured to virtualize the interrupts. For example, the hypervisor may provide a virtual interrupt to a virtual processor. Once the virtual interrupt is delivered to the virtual processor, the virtual processor may execute the virtual interrupt.

It is with respect to these and other general considerations that examples have been described. Also, although relatively specific problems have been discussed, it should be understood that the examples should not be limited to solving the specific problems identified in the background.

SUMMARY

This disclosure generally relates to enabling a hypervisor to provide one or more virtual interrupts to one or more virtual processors. More specifically, the hypervisor may be configured to provide the interrupt to a particular virtual processor in a group of processors once the particular virtual processor becomes available. For example, the hypervisor context may be used when any one of a specified set of virtual processor interrupt priorities drops below a hypervisor-specified priority.

In another example, the hypervisor may be configured to provide a particular virtual interrupt to the hardware of a host machine on which the hypervisor is executing. Once the hardware has the virtual interrupt, the hardware may provide the virtual interrupt to a particular virtual processor even if the virtual processor is not currently executing. However, when the virtual processor enters an operational state, the virtual interrupt may be immediately handled by the particular virtual processor.

Accordingly, described herein is a method that includes, among other features, monitoring, by a hypervisor of a host machine, a workload of a plurality of virtual processors. When an interrupt is received, the hypervisor determines a first virtual processor that can execute the interrupt. In some instances, this determination is based, at least in part, on the workload of each of the plurality of virtual processors and on a time frame that the first virtual processor can execute the interrupt. Once the first virtual processor is identified, the interrupt is provided to the first virtual processor but not to the other virtual processors in the plurality of virtual processors.

Also described is a method that includes determining a current priority of at least one virtual processor of the plurality of virtual processors. When an interrupt is received, a priority of the interrupt is determined. When it is determined that the priority of the interrupt is higher than the priority of the at least one virtual processor, the interrupt is provided to the at least one virtual processor. However, when it is determined that the priority of the interrupt is not higher than the priority of the at least one virtual processor, a determination is made as to whether one or more other virtual processors of the plurality of virtual processors has a lower priority. The interrupt is then delivered to one of the one or more other virtual processors of the plurality of virtual processors that has a lower priority.

The present application also describes a host machine that includes at least one processor and a memory coupled to the at least one processor. The memory stores instructions that, when executed by the at least one processor, perform a method that includes, among other features, causing a hypervisor to monitor a workload of each virtual processor in a plurality of virtual processors. When an interrupt is received, the hypervisor determines which virtual processor of the plurality of virtual processors is to receive the interrupt. In some cases, the determination is based, at least in part, on the workload of each virtual processor of the plurality of virtual processors. The interrupt may then be provided to the determined virtual processor.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments of the present disclosure describe how a hypervisor may handle or otherwise provide various interrupts that are received to various virtual processors. An interrupt is delivered to a virtual processor in order to signal to the virtual processor that work is to be done. In some instances, an interrupt may be associated with a priority. As such, interrupts with a higher priority may be handled by a virtual processor before interrupts with a lower priority.

In a system in which multiple virtual processors have been created and/or are executing, a hypervisor of the system may be able to queue various interrupts for each virtual processor. They hypervisor and/or the hardware associated with the hypervisor may also be aware of the current priority of interrupts each virtual processor is executing. As such, interrupts may be assigned to a virtual processor based, at least in part, on the priority of the interrupt that is to be queued and/or the current priority of interrupts the virtual processor is currently handling and/or are queued for the virtual processor.

These and other examples will be explained in more detail below with respect to FIG. 1-FIG. 7.

Figure 1:
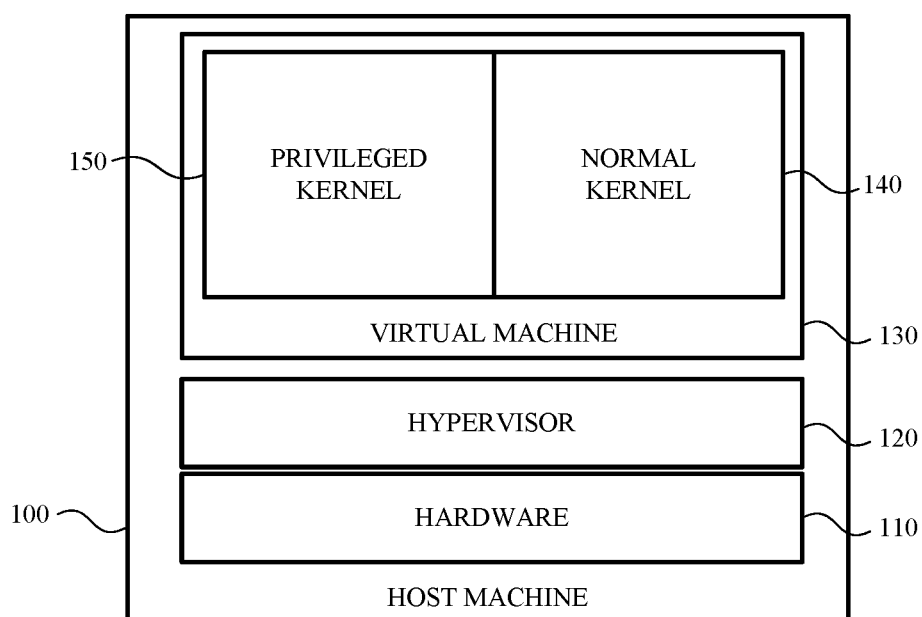
FIG. 1 illustrates an example host machine on which a hypervisor may be securely launched according to an example.

FIG. 1 illustrates an example host machine 100 on which a hypervisor 120 may be securely launched according to an example. In some implementations, the host machine 100 may be any computing device capable of launching one or more virtual machines, such as, for example, virtual machine 130. The host machine 100 may be a desktop computer, a laptop computer, a mobile computing device, a tablet computing device, a wearable computing device, a gaming device and so on.

As shown in FIG. 1, the host machine 100 may include hardware 110. The hardware 110 may include one or more processors, one or more storage devices, one or more memory devices and so on.

In the example shown in FIG. 1, the host machine 100 also includes a hypervisor 120. In some cases, the hypervisor 120 may be software, hardware, firmware or a combination thereof. As will be explained in more detail below, the hypervisor 120 is configured to create, run and/or manage one or more virtual machines 130.

In the example shown in FIG. 1, the hypervisor 120 is configured to communicate directly with the hardware 110 of the host machine 100. In such cases, the hypervisor 120 may be viewed as having the highest privilege level among the various other software, firmware and/or other hardware components of the host machine 100. Thus, for example, when the host machine 100 boots up, the hypervisor 120 may be the first item or component that is created, instantiated or otherwise executed on the host machine 100.

Once the hypervisor 120 is initialized, it may create one or more virtual machines 130. Each virtual machine 130 may emulate a computer system and, as such, may provide the functionality of a physical computing device. In some examples, the virtual machine 130 may include a privileged kernel 150 and a normal kernel 140.

The privileged kernel 150 may be configured to execute a secure operating system. As such, the privileged kernel 150 can run one or more secure programs that contain various secretes utilized by the virtual machine 130, the hypervisor 120, and/or the normal kernel 140. For example, the privileged kernel 150 may store various credentials, encryption keys and the like.

The normal kernel 140 may be configured to execute various "normal" programs and applications, such as, for example, word processing applications, browser applications, spreadsheet applications and so on. However, due to the less secure security configuration (e.g., when compared to the security configuration of the privileged kernel 150) of the normal kernel 140, the normal kernel 140 may not store any credentials, encryption keys, or other secrets that may be utilized by the virtual machine 130 and/or the hypervisor 120. As such, when various secrets are needed by the various applications running on the normal kernel 140, the normal kernel 140 may request those secrets from the privileged kernel 150. In another implementation, the normal kernel 140 may request that the privileged kernel 150 perform one or more actions, using one or more of the stored secrets, on behalf of the normal kernel 140 and/or one or more applications executing on the normal kernel.

In some instances and due to the hypervisor 120 allowing the virtual machine to execute both the privileged kernel 150 and the normal kernel 140, the hypervisor 120 may execute, or may cause the virtual machine 130 to execute, in a privileged context. The privileged context enables the hypervisor 120 to switch between the privileged kernel 150 and the normal kernel 140 and/or various user modes.

As the hypervisor 120 is responsible for various virtual machines 130 and each virtual machine's respective kernels, it is important that the hypervisor 120 be one of the most, if not the most secure component on the host machine 100. For example, if the hypervisor 120 is software, the hypervisor 120 may have the highest privilege level when compared to other software that may be executing on the host machine 100. In some cases, the hardware 110 provides the hypervisor 120 with privilege level architecture that enables the hypervisor 120 to run and to exert authority over every virtual machine 130 the hypervisor 120 creates. As will be explained in more detail below with respect to FIG. 3, the host machine 100 may include nested hypervisors. In such cases, the primary hypervisor may have authority over the secondary hypervisor.

Figure 2:
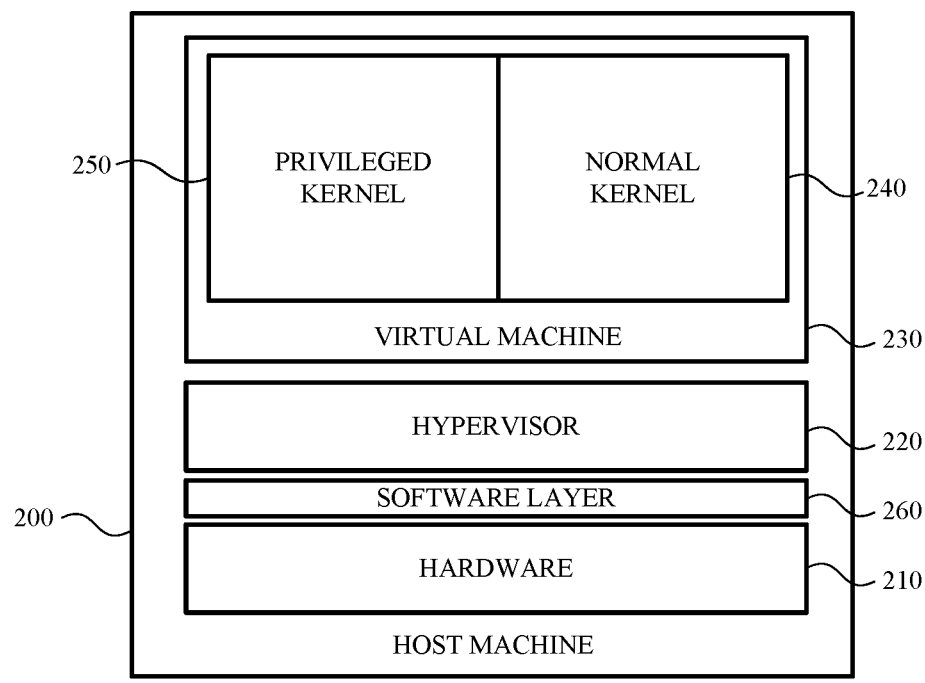
FIG. 2 illustrates another example host machine on which a software layer exists between the hypervisor and the hardware of the host machine according to an example.

FIG. 2 illustrates another example host machine 200 on which a software layer 260 exists between the hypervisor 220 and the hardware 210 of the host machine 200 according to an example. In this example, the hardware 210, the hypervisor 220 and virtual machine 230, the normal kernel 240 and the privileged kernel 250 may function in a similar manner such as was described above with respect to FIG. 1. However, in this example, the host machine 200 includes a software layer 260 positioned between the hypervisor 220 and the hardware 210.

In some cases, the software layer 260 may be responsible for certain aspects of the hardware 210. For example, the software layer 260 may be responsible for putting the host machine 200 in a sleep state, resuming programs or applications when the host machine 200 awakens from a sleep state and so on.

It is also possible that the software layer 260 has a higher privilege level than the hypervisor 220. In such cases, the hypervisor 220 should be configured to communicate directly with the software layer 260. That is, any communication between the software layer 260 and any of the other components (e.g., the privileged kernel 250, the normal kernel 240 etc.) of the host machine 200 should be routed through or otherwise mediated by the hypervisor 220. For example, any communication that occurs between the normal kernel 240 and the software layer 260 should be handled by the hypervisor 220. However, it is also possible that certain communication channels could be allowed directly between lower privilege software and the software layer 260 without each individual message having to go through the hypervisor 220.

In some cases when the software layer 260 is present, it may be desirable for the hypervisor 220 to be able to turn off or deactivate the software layer 260. For example, once the hypervisor 220 has been initialized, the hypervisor 220 may be configured to turn off the software layer 260, suspend operations performed by the software layer 260, intercept commands provided by or sent to the software layer 260 and so on. In this way, the hypervisor 220 may have the highest privilege level within the host machine 200. As such, security features of the host machine 200 may be improved as the hypervisor 220 controls communications between the various components of the host machine 200. As will also be described below, the host machine 200 may be able to determine that the hypervisor 220 was securely launched thereby preventing any attacks that may be brought to the host machine 200.

Figure 3:
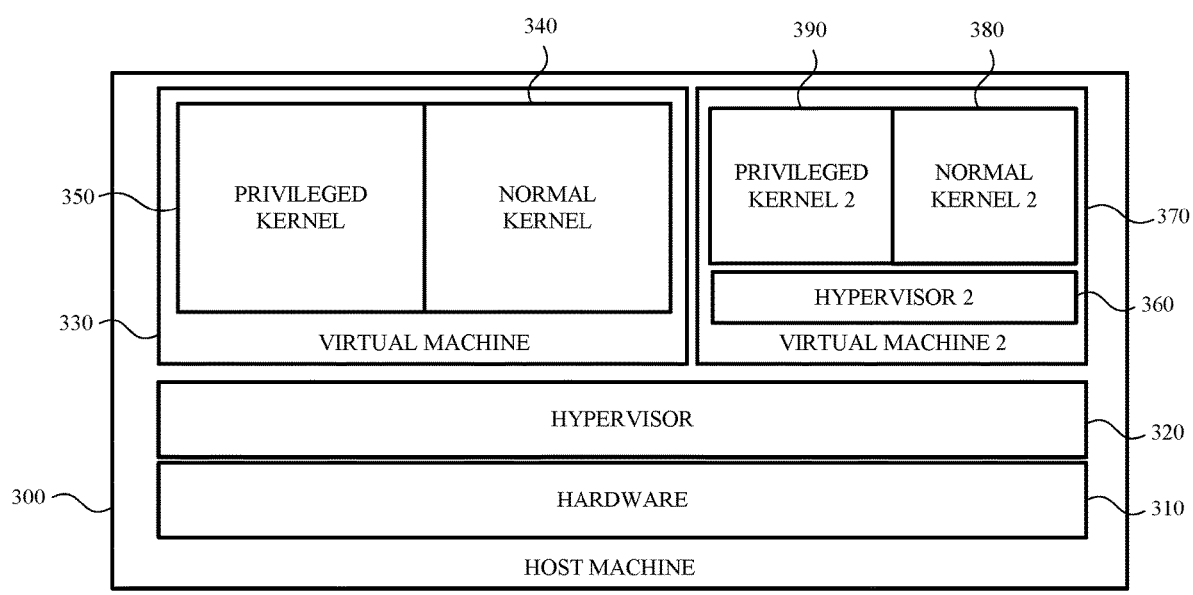
FIG. 3 illustrates an example host machine having nested hypervisors that support nested virtualization according to an example.

FIG. 3 illustrates an example host machine 300 having nested hypervisors that support nested virtualization according to an example. As shown in FIG. 3, the host machine 300 may include hardware 310 and a hypervisor 320. In some cases, the hardware 310 and the hypervisor 320 may function in a similar manner such as described above. For example, the hypervisor 320 may communicate with the hardware 310 as well as with a normal kernel 340 and a privileged kernel 350 of a virtual machine 330.

Additionally, the hypervisor 320, and/or the hardware 310, may be able to create, run, and/or command another hypervisor (shown in FIG. 3 as hypervisor 2 360) and another virtual machine (shown in FIG. 3 as virtual machine 2 370). As with the virtual machine 330, the virtual machine 2 370 may include a privileged kernel (shown in FIG. 3 as privileged kernel 2 390) and a normal kernel (shown in FIG. 3 as normal kernel 2 380). Each of these kernels may function in a similar manner to the normal kernel 140 and the privileged kernel 150 described above.

In some instances, each virtual machine may have one or more virtual processors. Further, each virtual machine may be associated with an identifier that enables a hypervisor 320 (or hypervisor 2 360) to target a specific virtual machine and its associated processors. The hypervisor 320 may also be configured to target a specific virtual processor associated with a virtual machine or a set of virtual processors associated with one or more virtual machines. This information may also be provided to the hardware 310. As such, a specific virtual processor may be targeted without enumerating through each virtual machine in order to find specific virtual processors.

The hypervisor 2 360 may communicate with and run the privileged kernel 2 390 and the normal kernel 2 380 in a similar manner as described above. For example, the hypervisor 2 360 of the virtual machine 2 370 may run in a privileged context, which enables the hypervisor 2 360 to switch between the privileged kernel 2 390 and the normal kernel 2 380.

The hypervisor 2 360 may believe that it is the only hypervisor in the host machine 300. However, the hypervisor 2 360 may be subject to and commanded by the hypervisor 320. That is, any communications between the hypervisor 2 360 and the hardware 310 may be passed through the hypervisor 320.

Although not shown in FIG. 3, the host machine 300 may also include a software layer, such as, for example, software layer 260 (FIG. 2). When the software layer is present, the hypervisor 2 360 should only be configured to communicate the hypervisor 320. In some cases, the hypervisor 2 360 will not be launched until a verification is received that the hypervisor 320 has been launched securely.

Regardless of the configuration of the host machine, it is imperative that the hypervisor be launched securely. The options to securely launch the hypervisor may differ depending on the configuration of the host machine. In some implementations, the options described below may be performed separately. In other implementations, the options described below are mutually exclusive. In yet other implementations, the options described below may be performed sequentially, simultaneously or substantially simultaneously.

The first option to ensure that the hypervisor is securely launched is to ensure that that the hardware (e.g., hardware 310) launches the hypervisor 320 once the host machine 300 boots. For example, the hardware 310 may have knowledge of where the hypervisor 320 binary is located and may be configured to immediately cause the hypervisor 320 to execute or establish a privilege level for the hypervisor upon booting up. Stated another way, the hypervisor 320, or a secure hypervisor loader associated with the hardware 310, can be authenticated and start executing before any non-secure code is executed. In some cases, the non-secure code may be part of the software layer 260 (FIG. 2).

A second option may be to include or otherwise provide access to a special boot loader. In some cases, the special boot loader may be able to leverage a specialized secure launch mechanism (e.g., an instruction or command) that causes the hardware 310 to launch the hypervisor 320 and ensure the hypervisor 320 is securely executed. In some cases, the second option may be used when the software layer 260 is present in the host machine and/or when a unified extensible firmware interface (UEFI) (or a basic input/output system (BIOS)) is executed prior to the hypervisor being launched.

In some cases, and regardless of which option above is used to launch the hypervisor 320, the hardware 310 may validate that the hypervisor 320 is in a secure state. If not, the hardware 310 may be configured to place the hypervisor 320 in the secure state. Once the hypervisor 320 is in the secure state, the hypervisor 320 may begin creating one or more virtual machines 330.

As discussed above, the hypervisor 320 may be configured to provide (via software and hardware architectural mechanisms) various different privilege levels. For example, the hypervisor 320 may allow the virtual machine 330 to execute in a "privileged" level and a "normal" level or "less privileged" level. Although two specific levels are mentioned, the hypervisor 320 may allow one or more virtual machines to execute in various different privilege levels.

Because of this configuration, the hypervisor 310 may be able to switch between the privileged kernel 350 and the normal kernel 340.

When the hypervisor 320 is in the privileged level, various platform details associated with the host machine 300 may be obtained by the hypervisor 320. In some cases, the platform details may be conveyed to the hypervisor 320 using one or more Advanced Configuration and Power Interface (ACPI) tables. In other cases, the hypervisor 320 may be instructed to search or otherwise obtain these platform details from various other software or hardware components associated with the host machine 300.

For example, in some cases, platform details may be hard-coded or discovered via a non-architectural interface. In this example, a highly privileged software module executing on host machine may be responsible for boot-strapping the system and providing these details.

In some cases, the details may include a location of one or more IOMMU that the hypervisor 320 may use to protect itself from direct memory access (DMA) attacks, how to zero some or all of the memory (e.g., on shutdown or reboot), how to power the host machine 300 down, how to reset the host machine 300, what the memory maps look like (e.g., what ranges include the MMIO, RAM, persistent memory, etc.), how to start additional processors, and so on.

Figure 4:
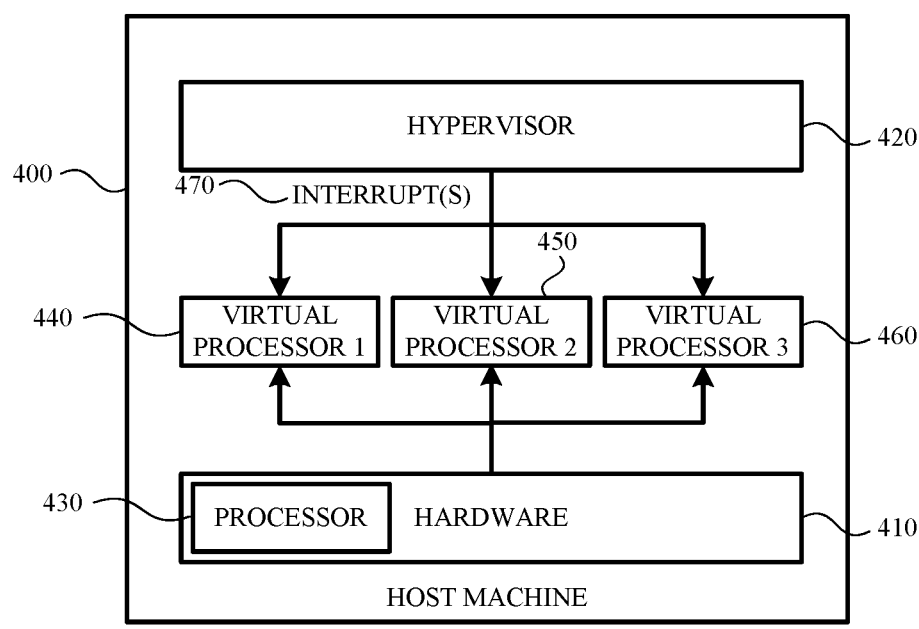
FIG. 4 a host machine having a logical processor and multiple virtual processors according to an example.

FIG. 4 illustrates a host machine 400 having a logical processor 440 and multiple virtual processors (e.g., virtual processor 1 440, virtual processor 2 450 and virtual processor 3 460) according to an example. Host machine 400 may be similar to host machine 100 (FIG. 1), host machine 200 (FIG. 2) and/or host machine 300 (FIG. 3).

As discussed above, the host machine 400 may include hardware 410 and a hypervisor 420. In some instances, the hypervisor 420 may be securely launched such as described above. The host machine 400 also includes at least one processor 430. The processor 430 may control or otherwise be associated with one or more virtual processors such as, for example, virtual processor 1 440, virtual processor 2 450 and virtual processor 3 460. Each of these virtual processors may be associated with a single virtual machine. In other examples, each of these virtual processors may be associated with different virtual machines. For example, virtual processor 1 440 and virtual processor 2 450 may be associated with a first virtual machine (e.g., virtual machine 330 (FIG. 3)) and virtual processor 3 460 may be associated with a second virtual machine (e.g., virtual machine 2 370 (FIG. 3)).

In some cases, the processor 430 is configured, by the hypervisor 420 to divide processing time between each virtual processor. That is, when one processor is active and executing, the other virtual processors may be inactive. For example, the processor 430 may cause virtual processor 1 440 to execute for a first amount of time. When that first amount of time ends, the processor 430 may cause virtual processor 2 450 to execute for a second amount of time (that may be the same as, or different than, the first amount of time). When the second amount of time ends, the processor 430 may cause virtual processor 3 460 to execute for a third amount of time (that may be the same as, or different than, the first amount of time and the second amount of time). In some cases, the processor 430 may split time between each virtual processor based on instructions from the hypervisor 420.

In addition, and as shown, each virtual processor may also be in communication with the hypervisor 420. As will be explained in more detail below, the hypervisor 420 may be configured to provide one or more interrupts 470 to each virtual processor and/or to the processor 430. In another implementation, the hardware 410 may be configured to provide the interrupts 470 to one or more of the virtual processors and/or the processor 430.

The hypervisor 420 may also be configured to virtualize various interrupts that are received from various software components executing on the host machine (and/or one or more software components executing on one or more virtual machines such as, for example, virtual machine 130 (FIG. 1)) and/or interrupts that are received from the hardware 410.

Typically, each interrupt 470 is associated with a priority. In some instances, when a processor, such as virtual processor 1 440 is executing an interrupt with a particular priority, that virtual processor is viewed as having that particular priority. In some instances, each virtual processor may have or otherwise be associated with different priorities. Accordingly, the hardware 410 and/or the hypervisor 420 may be configured to deliver interrupts with various priorities to each different virtual processor based, at least in part, on its current priority.

For example, if an interrupt with a priority of one is queued for virtual processor 1 440, and an interrupt with a priority of two is queued for virtual processor 2 450 and a new interrupt with a priority of one is received, the new interrupt with the priority of one may be delivered to virtual processor 2 450 and it would take priority over the virtual interrupt with the priority of two and would be executed first. It is also possible that virtual processor 3 460 is idle. In such a scenario, the hypervisor 420 may cause the new interrupt to be sent to virtual processor 3 460.

In other examples, various interrupts having different priorities may be queued for different virtual processors. For example, virtual processor 1 440 may have a number of interrupts in its queue and two or more of the interrupts may have different priorities. Likewise, virtual processor 2 450 and virtual processor 3 460 may also have any number of different interrupts in a queue with two or more having different priorities.

In such cases, the hardware 410 may be configured to monitor the priority of each virtual processor and inject or otherwise provide an interrupt with a corresponding priority to the virtual processor. In some example, the hardware 410 or the hypervisor 420 may be configured to query each virtual processor for its current priority so that the interrupts can be delivered accordingly.

For example, when a processor, such as virtual processor 440, has its priority drop to or below a priority associated with the interrupt 470, the hypervisor 420 or the hardware 410 may provide the interrupt 470 to that virtual processor.

In some cases, the hardware 410 and/or the hypervisor 420 may also be configured to track the load of each virtual processor. Thus, if one virtual process is less busy than another virtual processor, more interrupts may be provided to the less busy virtual processor. For example, the hardware 410 may deliver lower priority interrupts to the various virtual processors based on their current load.

In other cases, the hypervisor 420 may be configured to monitor the current load of each virtual processor. When a virtual processor is available (e.g., not executing an interrupt or its priority drops to or below a priority of a particular interrupt 470) the hypervisor may pend (e.g., virtually deliver) a particular interrupt 470 to that virtual processor. For example, the hardware 410 or the hypervisor 420 may be configured to deliver a lower priority interrupt to a particular virtual processor upon determining that the virtual processor has finished its higher priority work. The virtual processor may be configured to notify the hypervisor 420 that it has finished its work and is ready for additional work.

This is in contrast to current configurations in which a hypervisor may send a request to each virtual processor in a group of virtual processors. In that case, the first virtual processor that becomes available may execute the interrupt. However, the other virtual processors that were also notified of the interrupt, when available, may still request the interrupt from the hypervisor and/or notify the hypervisor that they are now available to handle the interrupt—even after the interrupt has already been handled by another virtual processor. This wastes valuable processing time.

However, the current implementation solves the above problem. As described above, the hypervisor 420 may hold one or more interrupts 470 and monitor virtual processor 1 440, virtual processor 2 450 and virtual processor 3 460. Once one of the virtual processors becomes available (e.g., their priority drops below the priority of the interrupt) the newly available virtual processor may notify the hypervisor 420 of its status (or priority). Once the notification is received and there are interrupts to execute, the hypervisor 420 may provide the interrupt 470 to the newly available virtual processor without notifying the other virtual processors.

In some examples, the hypervisor 420 may be configured to order the pending interrupts 470 in a particular order. In some examples, the interrupts 470 may be ordered based on the amount of time the interrupt has been pending, the priority of the interrupt, a schedule of when the virtual processors will be active and so on.

Continuing with the example above, the hypervisor 420 may receive an interrupt 470. The hypervisor 420 may monitor the status of each virtual processor and determine that virtual processor 2 450 is currently available or, based on the current load of the virtual processors, that virtual processor 2 will be available first. As such, the hypervisor 420 may provide the interrupt 470 to virtual processor 2 450 as soon as it becomes available (e.g., a priority of virtual processor 2 450 drops to or below a priority associated with the interrupt 470).

In some cases, an interrupt 470 may specify that a particular virtual processor is to handle the interrupt. In such cases, the hypervisor 420 may be required to provide the interrupt 470 to the specified virtual processor. However, when the virtual processor is not specified, the hypervisor 420 may select any one of the virtual processors to handle the interrupt 470.

In some examples, the hypervisor 420 may be configured to provide the interrupt to a virtual processor regardless of which virtual machine (or logical processor) the virtual processor is associated with. For example, if virtual machine 330 (FIG. 3) and virtual machine 2 370 (FIG. 3) each have virtual processors that are receiving interrupts, the hypervisor 320 may be configured to deliver interrupts to any of the virtual processors that are present on the host machine 300.

As describe above, the processor 430 may cause each virtual processor to be active at different times. As such, the hardware 410 may be configured to pend an interrupt 470 to a virtual processor even when the virtual processor is not currently executing. For example, if the hypervisor 420 determines that virtual processor 2 450 should receive a particular interrupt 470, but that interrupt is not currently executing, the hypervisor 420 may provide the interrupt 470 to the hardware 410.

When the hardware 410 receives the interrupt, the hypervisor 420 considers the interrupt 470 delivered. As such, the hypervisor 420 can continue to deliver other interrupts 470 as needed and/or perform other tasks. When the hardware 410 receives the interrupt 470, the hardware 410 may be configured to deliver or pend the interrupt 470 to the non-running virtual processor (e.g., virtual processor 2 450 in this example). However, the next time the virtual processor 2 450 is active, the interrupt 470 has already been delivered to (or is marked for delivery to) the virtual processor and may be executed.

In some cases, the hardware 410 doesn't need to track or otherwise monitor where the particular virtual processor is running (e.g., which logical processor is controlling the virtual processors). Instead, the hypervisor 420 may provide a data structure or other such memory device that specifies where the interrupt 470 should be delivered. The hardware 410 may have access to this data structure when it is determining where to deliver the interrupt 470.

The hypervisor 420 and/or the hardware 410 may also be configured to block various interrupts from being delivered to the virtual processors even if the interrupt has a higher priority than the virtual processor. In some example, the interrupts may be blocked because the virtual processor is executing critical activities. Once the critical activities are complete, the virtual processor may resume receiving interrupts.

Figure 5:
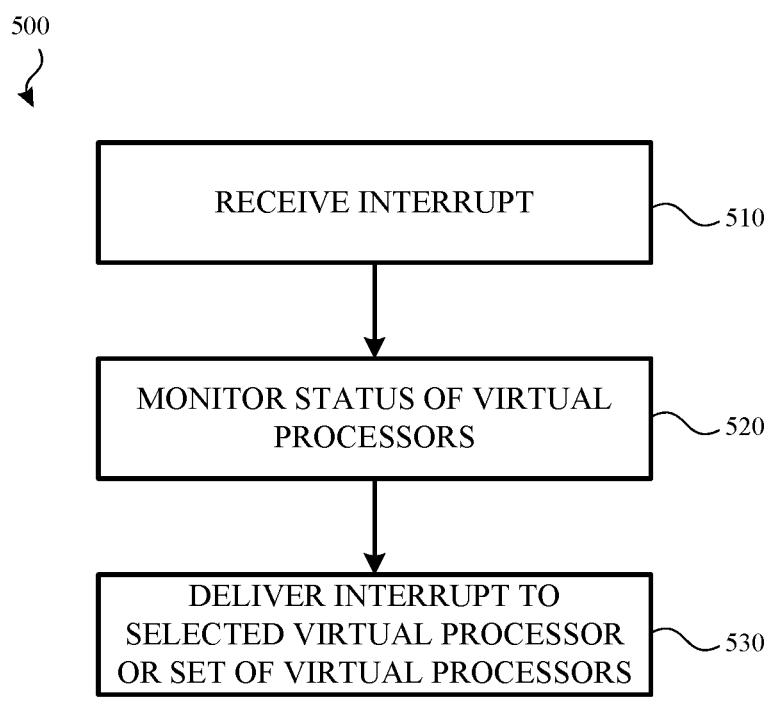
FIG. 5 illustrates a method for providing interrupts to one or more virtual processors according to an example.

FIG. 5 illustrates a method 500 for delivering a virtual interrupt to a virtual processor according to an example. The method 500 may be used by a virtual processor associated with a host machine such as described above.

Method 500 begins at operation 510 in which an interrupt is received by a hypervisor. In some instances, the interrupt may be associated with a priority. It is also contemplated that the hypervisor may receive multiple interrupts with each interrupt having its own priority. In such cases, the hypervisor may be configured to order the interrupts based on the priority (or based on some other factor such as, for example, length of time the interrupt has been pending).

Once the interrupt has been received, flow proceeds to operation 520 and the hypervisor monitors the status of each virtual processor. The hypervisor monitors the status of each virtual processor to determine which virtual processor should receive the interrupt. In some instances, the monitoring includes determining a workload of each virtual processor, a priority of each virtual processor, whether the virtual processor is executing critical tasks, whether the virtual processor is idle and so on.

Although method 500 shows operation 520 as being sequential with respect to operation 510, the hypervisor may be continuously monitoring the status of each virtual processor. In other cases, the virtual processor may be configured to report its status to the hypervisor and/or hardware associated with the hypervisor.

In some cases, a host machine may have multiple virtual machines and multiple hypervisors. In such cases, the main hypervisor may monitor each virtual processor (either by itself or with the help of child hypervisors that are associated with a nested virtual machine). Additionally, each child hypervisor may be configured to monitory its own virtual processors and/or any virtual processors associated with another nested virtual machine (e.g., a second nested virtual machine). Additionally, each virtual processor may be configured to report its status to one or more of the hypervisors (e.g., parent hypervisor and/or child hypervisor) associated with the host machine and/or the guest machine.

Flow then proceeds to operation 530 and the interrupt is delivered to a selected virtual processor or a set of virtual processors. In some instances, the hypervisor delivers the interrupt to the first available virtual processor or the virtual processor that will be able to execute the interrupt first regardless of the current workload of the virtual processor and/or the status of virtual processor. For example, the interrupt may be delivered to the virtual processor whose priority is lower than the priority of the interrupt. In some additional examples, the interrupt may also be delivered to a set of virtual processors.

Figure 6:
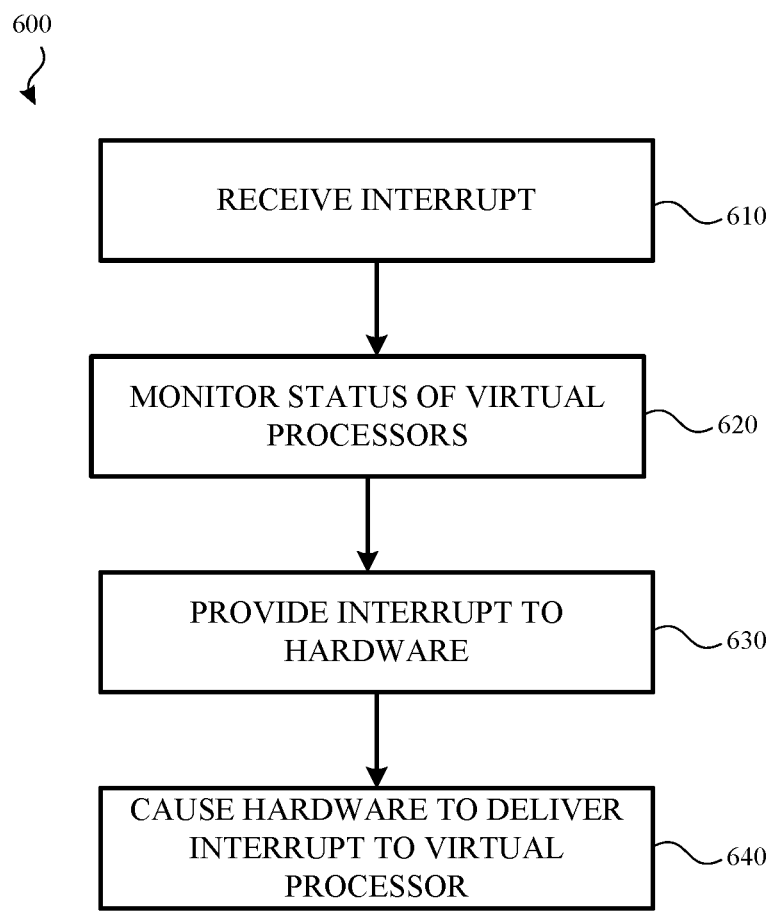
FIG. 6 illustrates a method for enabling hardware associated with a host machine to provide an interrupt to a virtual processor according to an example.

FIG. 6 illustrates a method 600 for delivering a virtual interrupt to a virtual processor according to an example. The method 600 may be used by a virtual processor associated with a host machine such as described above.

Method 600 begins at operation 610 in which an interrupt is received by a hypervisor. In some instances, the interrupt may be associated with a priority. It is also contemplated that the hypervisor may receive multiple interrupts and with each interrupt having its own priority. In such cases, the hypervisor may be configured to order the interrupts based on the priority (or based on some other factor such as, for example, length of time the interrupt has been pending).

Once the interrupt has been received, flow proceeds to operation 620 and the hypervisor monitors the status of each virtual processor to determine which virtual processor should receive the interrupt. Similar to what was described above, although method 600 shows operation 620 as being sequential with respect to operation 610, the hypervisor may be continuously monitoring the status of each virtual processor. In some cases, a host machine may have multiple virtual machines and multiple hypervisors. In such cases, the main hypervisor may monitor each virtual processor (either by itself or with the help of child hypervisors that are associated with a nested virtual machine). Additionally, each child hypervisor may be configured to monitory its own virtual processors and/or any virtual processors associated with another nested virtual machine (e.g., a second nested virtual machine).

Once the interrupt is received, flow may proceed to operation 630 in which the interrupt is delivered to the hardware of the host machine. As part of the delivery, the hardware may also receive the priority of the interrupt as well as an identification as to which virtual processor the interrupt is to be delivered to. The hardware may then store the interrupt as well as the associated information.

In some instances, the hypervisor may be configured to provide or otherwise store the interrupt in a data structure that the hardware has access to. The hypervisor may then notify the hardware of the pending interrupt and where it is located in the data structure. In such cases, the hardware may not need to track which processor is in charge of each virtual processor or where each virtual processor is located.

For example, the hardware may include a virtual interrupt controller that assists the hardware in storing and/or delivering received interrupts. For example, the virtual interrupt controller may be configured to notify the hardware or otherwise store an identifier of the virtual processor the virtual interrupt controller is associated with. In some cases, an interrupt may also have an associated identifier that identifies a particular virtual interrupt controller and/or a particular virtual processor. Once the identifier of the interrupt is determined, the hardware or the virtual interrupt controller may deliver the interrupt to the identified virtual processor (e.g., the virtual processor having a corresponding identifier). In some cases, the interrupt may be delivered to the virtual processor regardless of where the virtual processor is executing and regardless of which virtual machine (or host machine) the virtual processor is currently associated with. In some cases, the hardware may have access to another data structure that stores information about each logical processor in the system as well as each virtual processor associated with each logical processor. For example, the data structure may be a bit map in which one axis has an entry for each virtual processor and the other axis has an entry for each logical processor. A bit in the bit map is set for each virtual processor that is associated with each logical processor. That is, when a particular virtual processor is running on a particular logical processor, the intersection in the bit map between that virtual processor and the logical processor is set. Using the other information described above (e.g., an identifier and/or a priority associated with the interrupt) the hardware and/or the hypervisor may be able to deliver an interrupt to a specified virtual processor while reducing the burden on silicon.

Flow then proceeds to operation 640 and the hardware delivers the interrupt to the identified virtual processor. In some instances, the hardware may deliver the interrupt to a virtual processor even if the virtual processor is not currently active. In other cases, the hardware may mark the interrupt as intended for the virtual processor. In either case, once the virtual processor is active, it may already have or otherwise be aware of the interrupt and execute the interrupt such as described above. In some cases, a hypervisor may be configured to move a virtual processor from the host machine to a guest/virtual machine and vice versa.

Figure 7:
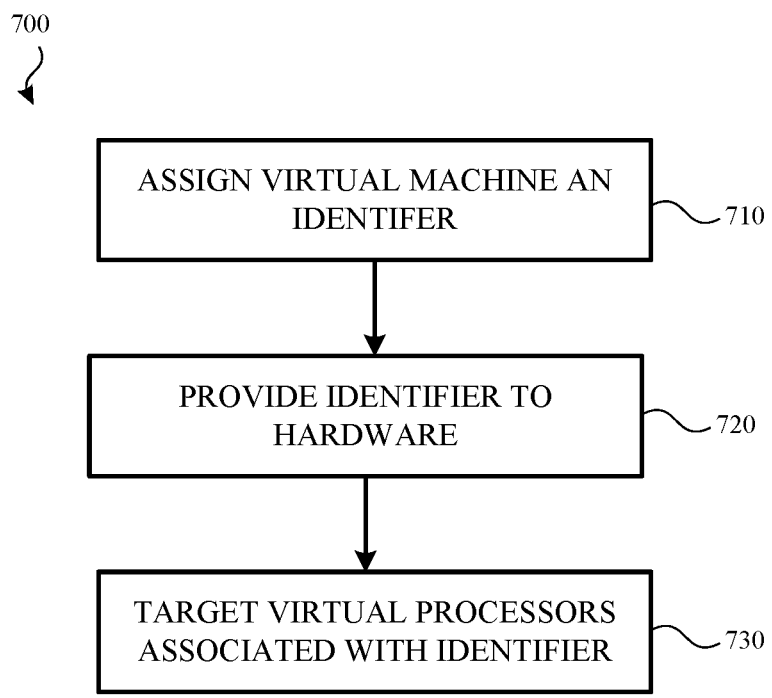
FIG. 7 illustrates a method for assigning an identifier to a virtual machine according to an example.

In some instances, a virtual machine, such as, for example, virtual machine 330 and virtual machine 2 370 (FIG. 3) may be associated with or assigned an identifier. FIG. 7 illustrates a method 700 for assigning an identifier to a particular virtual machine and using the identifier to target a specific virtual processor. In some instances, the identifier may be used in conjunction with a data structure, such as the bit map described above, in order to quickly and efficiently determine which logical processor is hosting which virtual processor(s).

In some instances, a virtual machine may broadcast an inter-processor-interrupt (IPI) to all of its virtual processors. In doing so, the virtual machine may write one or more instructions to its associated virtual interrupt controller. The hypervisor associated with the virtual machine may track these instructions and see that the virtual machine wants to broadcast to all of its virtual processors or a subset of its virtual processors. In response, the hypervisor may enumerate all of the virtual processors and determine which logical processor the virtual processors operate on. Once that is discovered, the hypervisor may send a physical broadcast interrupt to the logical processor and inject a virtual interrupt. In some cases, this may be expensive in terms of processing power. As such, method 700 illustrates how the hardware can assist in identifying specific virtual machines and their associated virtual processors.

As such, in operation 710, each virtual machine associated with a particular host system may be assigned an identifier. In some instances, the identifier may also include information or some other identifier about each virtual processor associated with that virtual machine.

Once the identifier is assigned to each virtual machine, the hypervisor may be able to target a specific virtual machine and its associated virtual processors when providing an interrupt to the virtual processors. For example, in operation 720, the identifier of a specific virtual machine may be provided to the hardware. That is, the hypervisor may provide the identifier of a specific virtual machine to the hardware.

Flow then proceeds to operation 730 and the hardware targets or otherwise causes the virtual processors associated with the identified virtual machine to awaken or otherwise be active. The hardware may also provide an interrupt to one or more of the available virtual processors such as described above. In one example, if one of the virtual processors isn't active, the hardware may pend the interrupt to the inactive virtual processor such as described above.

FIG. 8-FIG. 11 and their associated descriptions provide a discussion of a variety of operating environments in which aspects of the disclosure may be practiced. However, the devices and systems illustrated and discussed with respect to FIG. 8-FIG. 11 are for purposes of example and illustration and are not limiting of a vast number of electronic device configurations that may be utilized for practicing aspects of the disclosure, as described herein.

Figure 8:
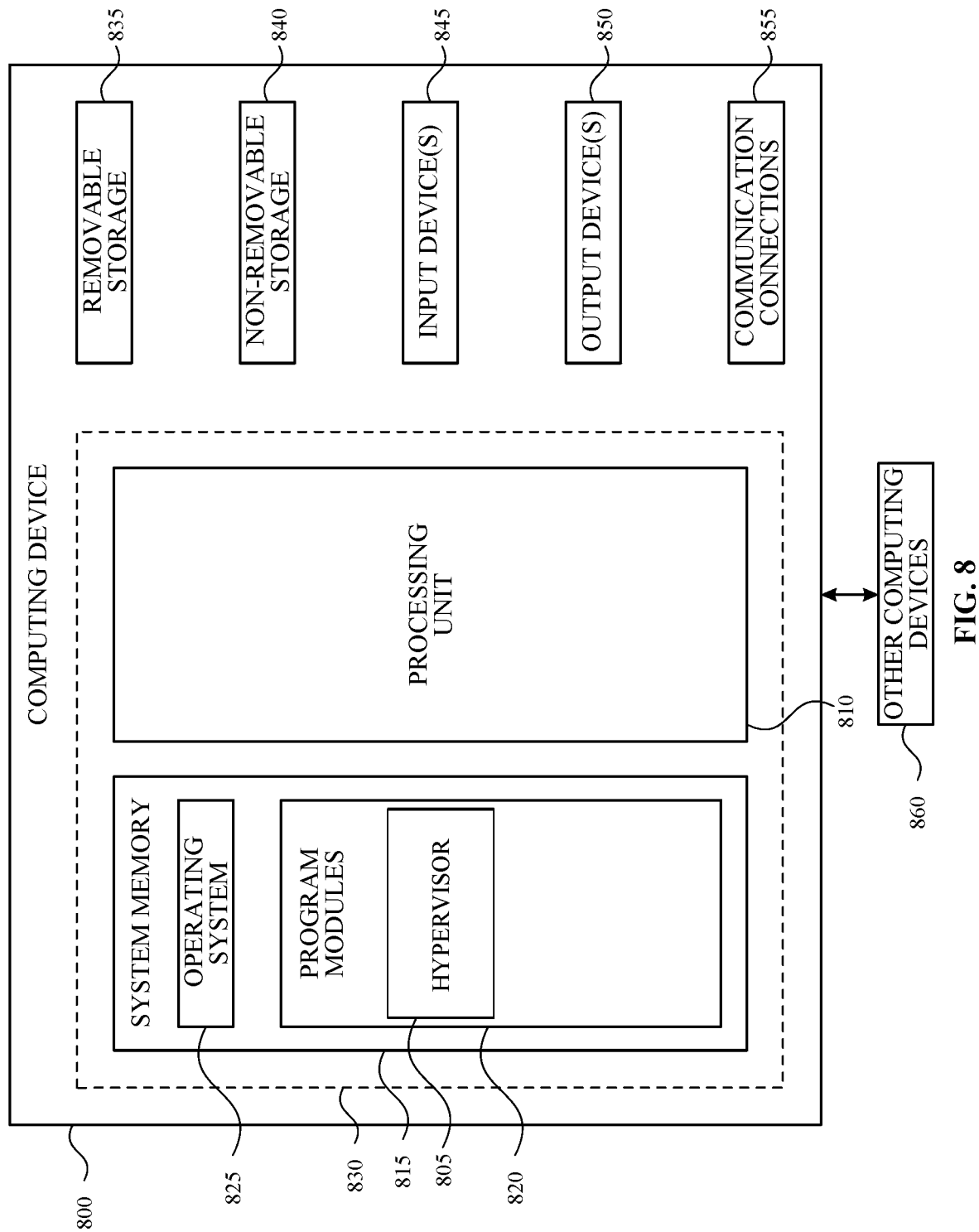
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device 800 may be similar to the host machine 100 described above with respect to FIG. 1.

In a basic configuration, the computing device 800 may include at least one processing unit 810 and a system memory 815. Depending on the configuration and type of computing device 800, the system memory 815 may comprise, but is not limited to, volatile storage (e.g., random access memory), non-volatile storage (e.g., read-only memory), flash memory, or any combination of such memories. The system memory 815 may include an operating system 825 and one or more program modules 820 or components suitable for identifying various objects contained within captured images such as described herein.

The operating system 825, for example, may be suitable for controlling the operation of the computing device 800. Furthermore, examples of the disclosure may be practiced in conjunction with a graphics library, other operating systems, or any other application program and is not limited to any particular application or system. This basic configuration is illustrated in FIG. 8 by those components within a dashed line 830.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 835 and a non-removable storage device 840.

As stated above, a number of program modules and data files may be stored in the system memory 815. While executing on the processing unit 810, the program modules 820 (e.g., a hypervisor 805) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 800 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned devices are examples and others may be used. The electronic device 800 may include one or more communication connections 855 allowing communications with other computing devices 860. Examples of suitable communication connections 855 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 815, the removable storage device 835, and the non-removable storage device 840 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
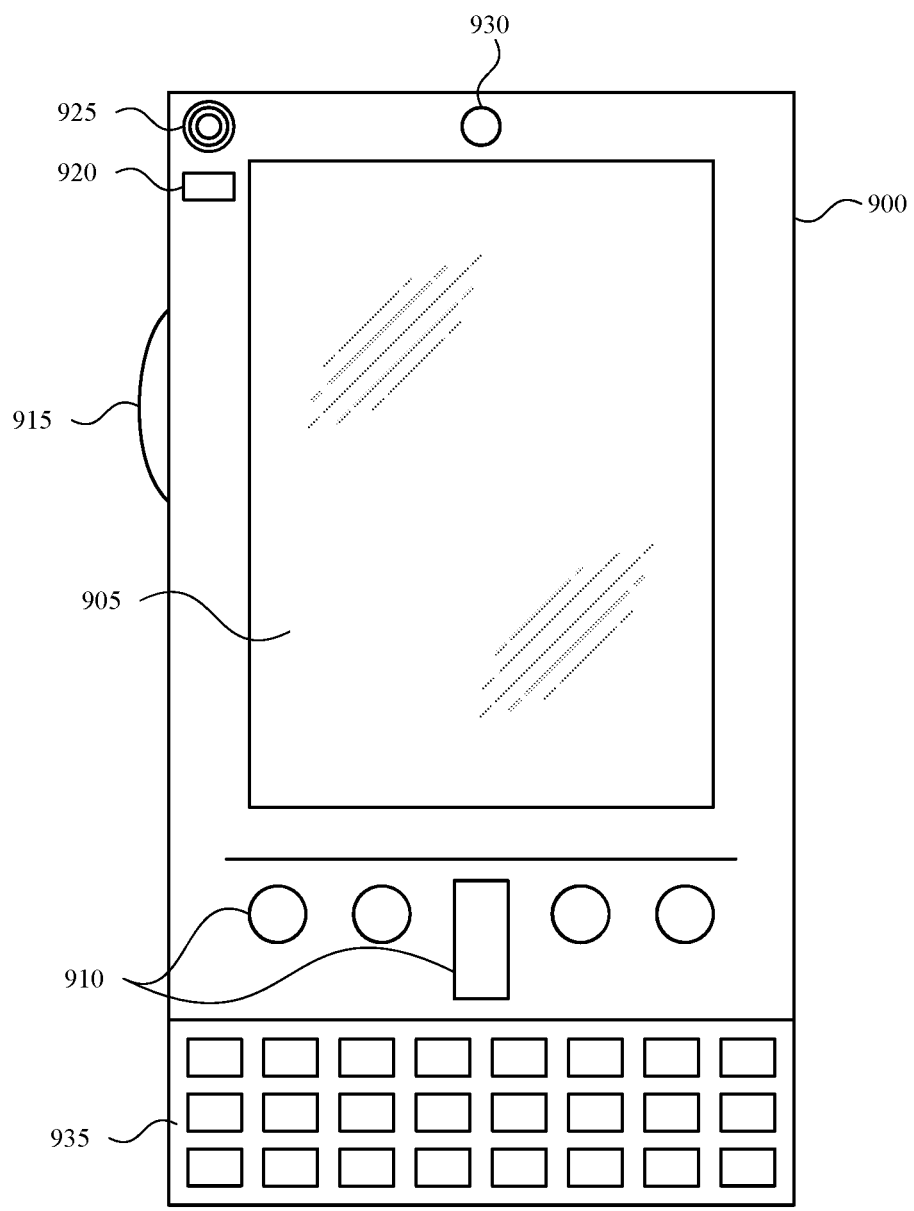
FIGS. 9A and 9B are simplified block diagrams of a mobile computing device with which aspects of the present disclosure may be practiced.
Figure 9B:
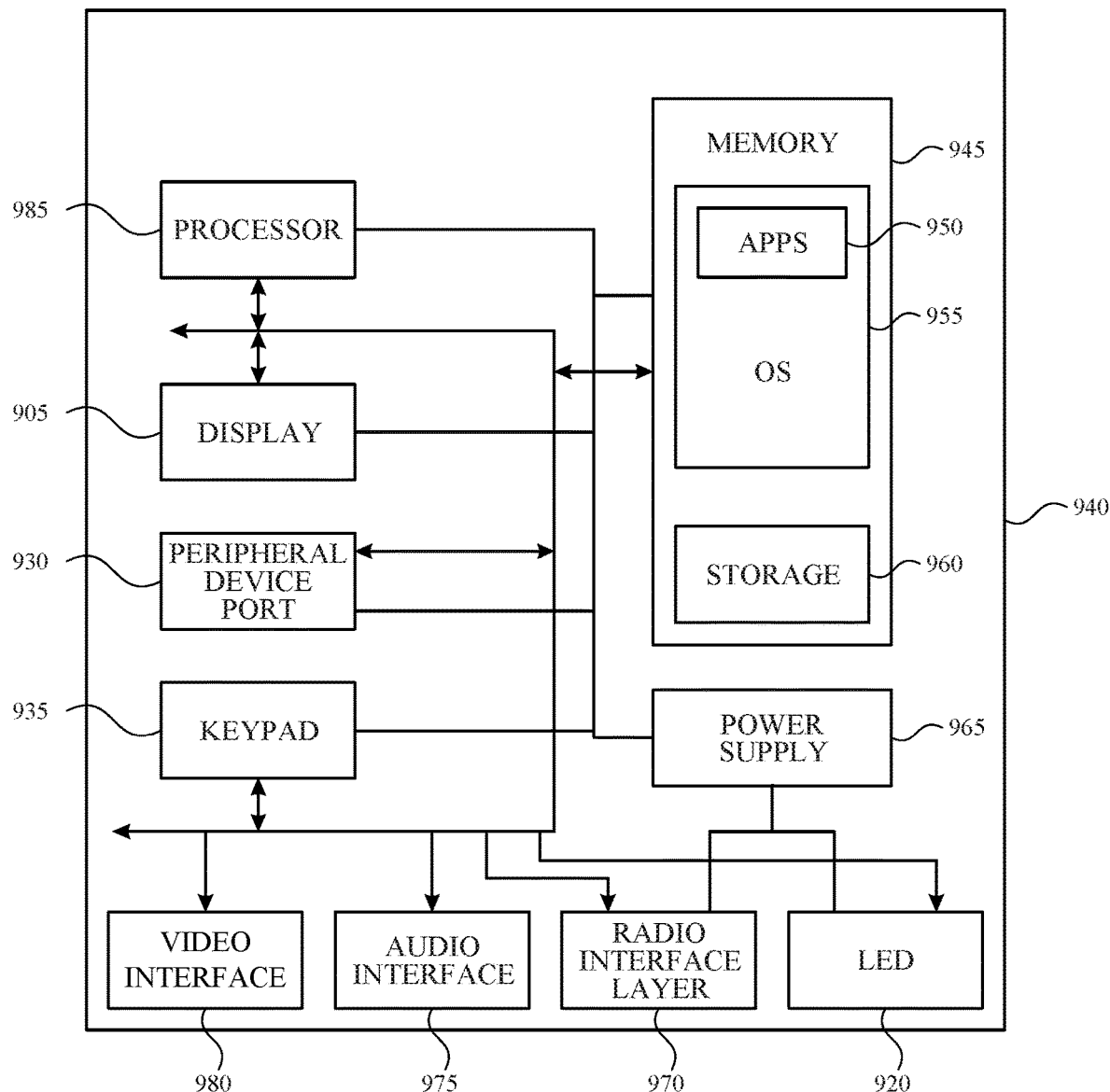

FIGS. 9A and 9B illustrate a mobile computing device 900, for example, a mobile telephone, a smart phone, wearable computer (such as a smart watch), a tablet computer, a laptop computer, and the like, with which examples of the disclosure may be practiced. With reference to FIG. 9A, one aspect of a mobile computing device 900 for implementing the aspects is illustrated.

In a basic configuration, the mobile computing device 900 is a handheld computer having both input elements and output elements. The mobile computing device 900 typically includes a display 905 and one or more input buttons 910 that allow an individual to enter information into the mobile computing device 900. The display 905 of the mobile computing device 900 may also function as an input device (e.g., a display that accepts touch and/or force input).

If included, an optional side input element 915 allows further input. The side input element 915 may be a rotary switch, a button, or any other type of manual input element. In alternative aspects, mobile electronic device 900 may incorporate more or less input elements. For example, the display 905 may not be a touch screen in some examples. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display.

In various examples, the output elements include the display 905 for showing a graphical user interface (GUI) (such as the one described above that provides visual representation of a determined pronunciation and may receive feedback or other such input, a visual indicator 920 (e.g., a light emitting diode), and/or an audio transducer 925 (e.g., a speaker). In some aspects, the mobile computing device 900 incorporates a vibration transducer for providing an individual with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device 900. That is, the mobile computing device 900 can incorporate a system (e.g., an architecture) 940 to implement some aspects. In one embodiment, the system 940 is implemented as a "smart phone" capable of running one or more applications (e.g., browser, e-mail, calendaring, contact managers, messaging clients, games, media clients/players, content selection and sharing applications and so on). In some aspects, the system 940 is integrated as an electronic device, such as an integrated personal digital assistant (PDA) and wireless phone.

One or more application programs 950 may be loaded into the memory 945 and run on or in association with the operating system 955. Examples of the application programs include phone dialer programs, e-mail programs, personal information management (PIM) programs, word processing programs, spreadsheet programs, Internet browser programs, messaging programs, and so forth.

The system 940 also includes a non-volatile storage area 960 within the memory 945. The non-volatile storage area 960 may be used to store persistent information that should not be lost if the system 940 is powered down.

The application programs 950 may use and store information in the non-volatile storage area 960, such as email or other messages used by an email application, and the like. A synchronization application (not shown) also resides on the system 940 and is programmed to interact with a corresponding synchronization application resident on a host computer to keep the information stored in the non-volatile storage area 960 synchronized with corresponding information stored at the host computer.

The system 940 has a power supply 965, which may be implemented as one or more batteries. The power supply 965 may further include an external power source, such as an AC adapter or a powered docking cradle that supplements or recharges the batteries.

The system 940 may also include a radio interface layer 970 that performs the function of transmitting and receiving radio frequency communications. The radio interface layer 970 facilitates wireless connectivity between the system 940 and the "outside world," via a communications carrier or service provider. Transmissions to and from the radio interface layer 970 are conducted under control of the operating system 955. In other words, communications received by the radio interface layer 970 may be disseminated to the application programs 950 via the operating system 955, and vice versa.

The visual indicator 920 may be used to provide visual notifications, and/or an audio interface 975 may be used for producing audible notifications via an audio transducer (e.g., audio transducer 925 illustrated in FIG. 9A). In the illustrated embodiment, the visual indicator 920 is a light emitting diode (LED) and the audio transducer 925 may be a speaker. These devices may be directly coupled to the power supply 965 so that when activated, they remain on for a duration dictated by the notification mechanism even though the processor 985 and other components might shut down for conserving battery power. The LED may be programmed to remain on indefinitely until the individual takes action to indicate the powered-on status of the device.

The audio interface 975 is used to provide audible signals to and receive audible signals from the individual (e.g., voice input such as described above). For example, in addition to being coupled to the audio transducer 925, the audio interface 975 may also be coupled to a microphone to receive audible input, such as to facilitate a telephone conversation. In accordance with examples of the present disclosure, the microphone may also serve as an audio sensor to facilitate control of notifications, as will be described below.

The system 940 may further include a video interface 980 that enables an operation of peripheral device 930 (e.g., on-board camera) to record still images, video stream, and the like.

A mobile computing device 900 implementing the system 940 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 960.

Data/information generated or captured by the mobile computing device 900 and stored via the system 940 may be stored locally on the mobile computing device 900, as described above, or the data may be stored on any number of storage media that may be accessed by the device via the radio interface layer 970 or via a wired connection between the mobile electronic device 900 and a separate electronic device associated with the mobile computing device 900, for example, a server computer in a distributed computing network, such as the Internet. As should be appreciated such data/information may be accessed via the mobile computing device 900 via the radio interface layer 970 or via a distributed computing network. Similarly, such data/information may be readily transferred between electronic devices for storage and use according to well-known data/information transfer and storage means, including electronic mail and collaborative data/information sharing systems.

As should be appreciated, FIG. 9A and FIG. 9B are described for purposes of illustrating the present methods and systems and is not intended to limit the disclosure to a particular sequence of steps or a particular combination of hardware or software components.

Figure 10:
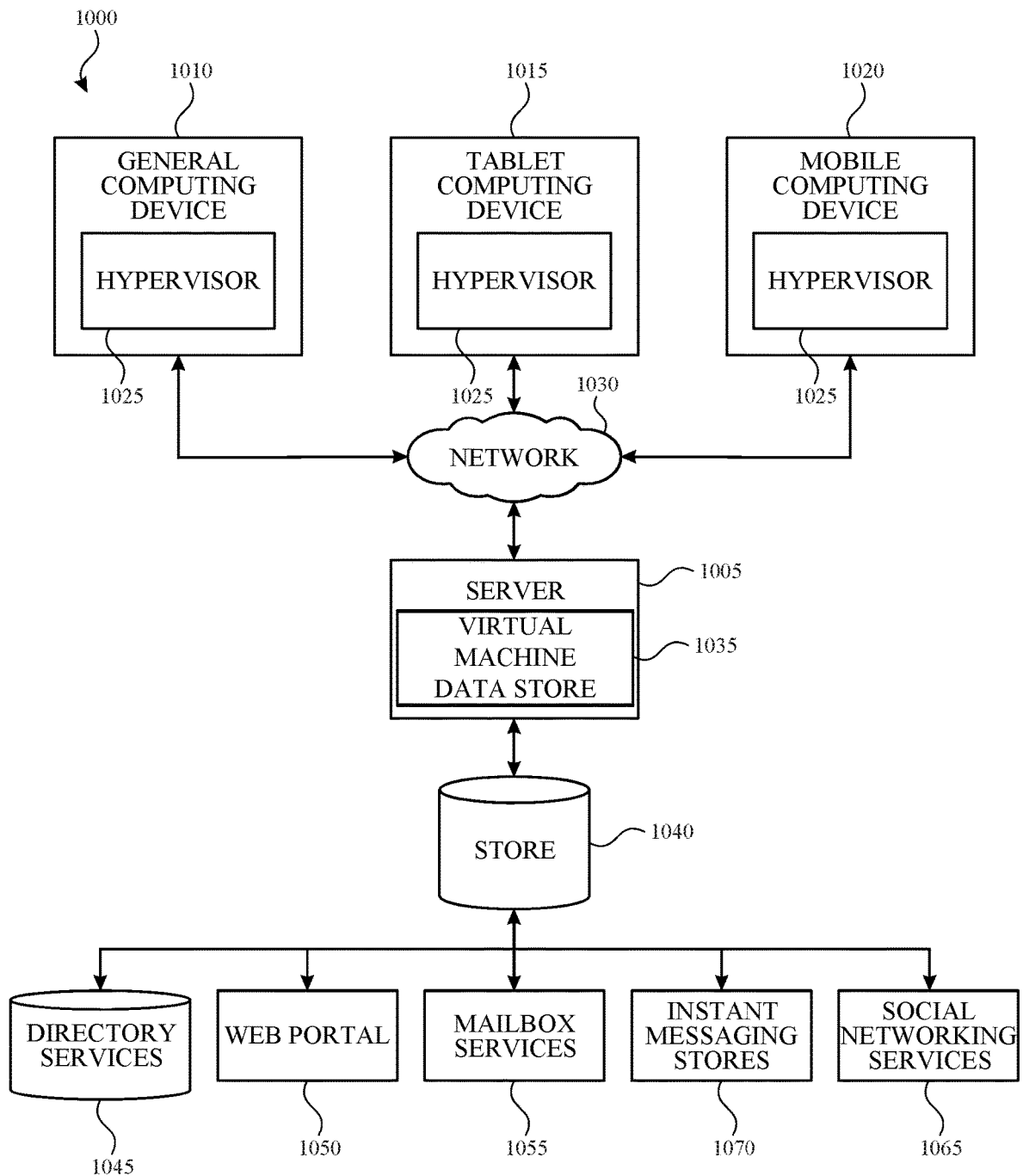
FIG. 10 is a simplified block diagram of a distributed computing system in which aspects of the present disclosure may be practiced.

FIG. 10 illustrates one aspect of the architecture of a system 1000 for providing virtualization using a plurality of computing devices. The system 1000 may include a general computing device 1010 (e.g., personal computer), tablet computing device 1015, or mobile computing device 1020, as described above. Each of these devices may include a hypervisor 1025 such as described herein.

In some aspects, each of the general computing device 1010 (e.g., personal computer), tablet computing device 1015, or mobile computing device 1020 may receive various other types of information or content that is stored by or transmitted from a directory service 1045, a web portal 1050, mailbox services 1055, instant messaging stores 1060, or social networking services 1065.

In aspects, and as described above, each computing device may have access to a virtual machine data store 1035 that is provided on a server 1005, the cloud or some other remote computing device.

By way of example, the aspects described above may be embodied in a general computing device 1010, a tablet computing device 1015 and/or a mobile computing device 1020. Any of these examples of the electronic devices may obtain content from or provide data to the store 1040.

As should be appreciated, FIG. 10 is described for purposes of illustrating the present methods and systems and is not intended to limit the disclosure to a particular sequence of steps or a particular combination of hardware or software components.

Figure 11:
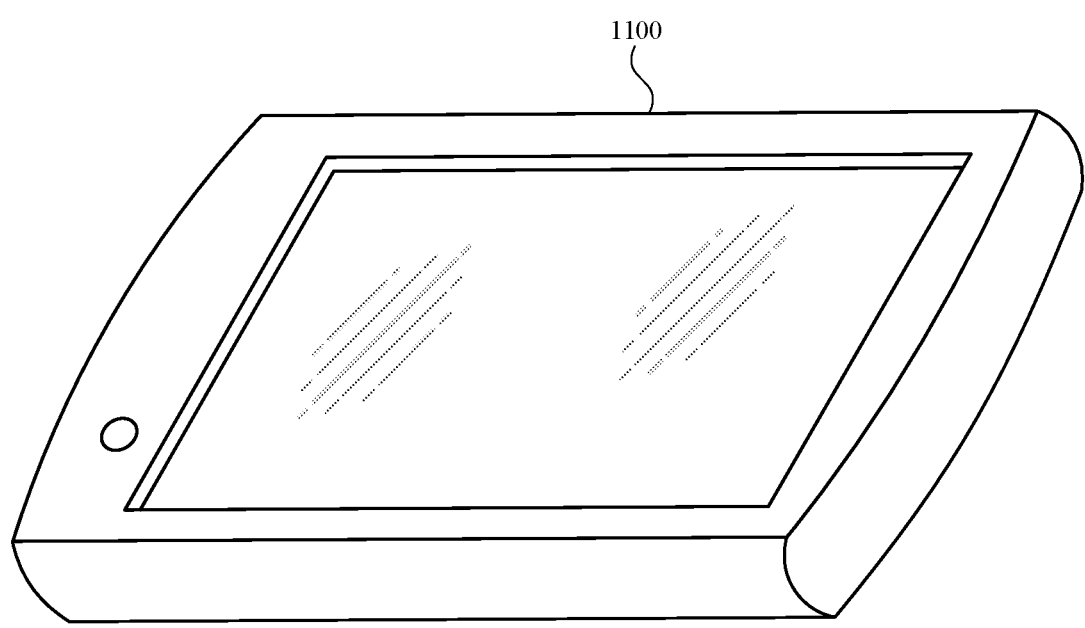
FIG. 11 illustrates a tablet computing device for executing one or more aspects of the present disclosure.

FIG. 11 illustrates an example tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting gestures for controlling the functionality of the electronic device, and the like.

As should be appreciated, the figures herein FIG. 11 is described for purposes of illustrating the present methods and systems and is not intended to limit the disclosure to a particular sequence of steps or a particular combination of hardware or software components.

Examples of the present disclosure provide a method, comprising: monitoring, by a hypervisor of a host machine, a workload of a plurality of virtual processors; receiving an interrupt; determining, by the hypervisor and based on the workload of each of the plurality of virtual processors, a first virtual processor that can execute the interrupt, wherein the first virtual processor is determined based on a time frame that the first virtual processor can execute the interrupt; and providing the interrupt to the first virtual processor but not to the other virtual processors in the plurality of virtual processors. In other examples, each of the plurality of virtual processors is associated with a virtual machine. In some examples, the method also includes assigning an identifier to the virtual machine. In some examples, the method also includes providing the interrupt to hardware associated with the host machine when the first virtual processor is not active. In some examples, the hardware pends the interrupt to the first virtual processor. In some examples, the interrupt is associated with a priority. In some examples, each of the plurality of virtual processors is associated with a priority.

The present disclosure also describes a method, comprising: determining a current priority of at least one virtual processor of the plurality of virtual processors; receiving an interrupt; determining a priority of the interrupt; when it is determined that the priority of the interrupt is higher than the priority of the at least one virtual processor, providing the interrupt to the at least one virtual processor; when it is determined that the priority of the interrupt is not higher than the priority of the at least one virtual processor, determining whether one or more other virtual processors of the plurality of virtual processors has a lower priority; and delivering the interrupt to one of the one or more other virtual processors of the plurality of virtual processors that has a lower priority. In some examples, each of the plurality of virtual processors is associated with a logical processor. In some examples, the method also includes determining whether the priority of the interrupt is higher than the priority of the virtual processor. In some examples, the method also includes delivering the interrupt to the one of the one or more other virtual processors of the plurality of virtual processors that has a corresponding priority when it is determined that the priority of interrupt is not higher than the priority of the virtual processor. In some examples, the one of the one or more other virtual processors has a priority that is lower than the priority of the interrupt. In some examples, the method also includes determining a workload of each virtual processor. In some examples, the method also includes determining whether the virtual processor is executing critical activities. In some examples, the method also includes blocking a delivery of interrupts to the virtual processor when it is determined that the virtual processor is executing critical activities.

The present application also describes a host machine, comprising: at least one processor; and a memory coupled to the at least one processor and storing instructions that, when executed by the at least one processor, perform a method, comprising: causing a hypervisor to monitor a workload of each virtual processor in a plurality of virtual processors; receiving an interrupt; causing the hypervisor to determine which virtual processor of the plurality of virtual processors is to receive the interrupt, wherein the determination is based, at least in part, on the workload of each virtual processor of the plurality of virtual processors; and providing the interrupt to the determined virtual processor. In some examples, the memory also includes instructions for assigning an identifier to the virtual processor. In some examples, the memory also includes instructions for providing the interrupt to hardware associated with the host machine when the virtual processor is not active. In some examples, the interrupt is associated with a priority. In some examples, each of the plurality of virtual processors is associated with a priority.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
    monitoring, by a hypervisor of a host machine, a workload of a plurality of virtual processors;
    receiving an interrupt, the interrupt being associated with a priority;
    determining, by the hypervisor and based, at least in part, on the workload of each of the plurality of virtual processors and the priority associated with the interrupt, a first virtual processor of the plurality of virtual processors that can execute the interrupt before other virtual processors of the plurality of virtual processors; and
    providing, by the hypervisor to a virtual interrupt controller, an indication of the interrupt comprising an association of the interrupt and the determined first virtual processor, thereby causing the virtual interrupt controller to deliver the interrupt to the determined first virtual processor but not to the other virtual processors of the plurality of virtual processors.

2. The method of claim 1, wherein each of the plurality of virtual processors is associated with a virtual machine.

3. The method of claim 2, further comprising assigning an identifier to the virtual machine.

4. The method of claim 1, further comprising providing the interrupt to the virtual interrupt controller when the first virtual processor is not active.

5. The method of claim 4, wherein the virtual interrupt controller pends the interrupt to the first virtual processor.

6. The method of claim 1, wherein each of the plurality of virtual processors is associated with a priority.

7. The method of claim 1, wherein the first virtual processor has pending interrupts.

8. A method, comprising:
    determining a current priority of a first virtual processor of a plurality of virtual processors;
    receiving an interrupt;
    determining a priority of the interrupt;
    when it is determined that the priority of the interrupt is higher than the priority of the first virtual processor:
        providing, to a virtual interrupt controller, an indication of the interrupt comprising an association of the interrupt and the first virtual processor, thereby causing the virtual interrupt controller to deliver the interrupt to the first virtual processor but not other virtual processors of the plurality of virtual processors; and
    when it is determined that the priority of the interrupt is not higher than the priority of the first virtual processor:
        determining a priority of a second virtual processor of the plurality of virtual processors; and
        when it is determined that the priority of the second virtual processor has a lower priority than the first virtual processor, providing, to the virtual interrupt controller, an indication of the interrupt comprising an association of the interrupt and the second virtual processor, thereby causing the virtual interrupt controller to deliver the interrupt to the second virtual processor but not other virtual processors of the plurality of virtual processors.

9. The method of claim 8, wherein each of the plurality of virtual processors is associated with a logical processor.

10. The method of claim 8, further comprising determining a workload of each virtual processor.

11. The method of claim 8, further comprising determining whether the first virtual processor is executing critical activities.

12. The method of claim 11, further comprising blocking a delivery of interrupts to the first virtual processor when it is determined that the first virtual processor is executing critical activities.

13. The method of claim 8, further comprising instructions for providing the interrupt to the virtual interrupt controller when the first virtual processor or the second virtual processor is not active.

14. A host machine, comprising:
    at least one processor; and
    a memory coupled to the at least one processor and storing instructions that, when executed by the at least one processor, perform operations, comprising:
        causing a hypervisor to monitor a workload of each virtual processor in a plurality of virtual processors;
        receiving an interrupt, the interrupt being associated with a priority;
        causing the hypervisor to determine which virtual processor of the plurality of virtual processors can process the interrupt before other virtual processors of the plurality of virtual processors, wherein the determination is based, at least in part, on the workload of each virtual processor of the plurality of virtual processors and the priority associated with the interrupt; and
        providing, from the hypervisor to a virtual interrupt controller, an indication of the interrupt comprising an association of the interrupt and the determined virtual processor, thereby causing the virtual interrupt controller to deliver the interrupt to the determined virtual processor.

15. The host machine of claim 14, further comprising instructions for assigning an identifier to the virtual processor.

16. The host machine of claim 14, further comprising instructions for providing the interrupt to the virtual interrupt controller when the virtual processor is not active.

17. The host machine of claim 14, wherein each of the plurality of virtual processors is associated with a priority.

18. The host machine of claim 14, wherein the determined virtual processor has pending interrupts.

19. The host machine of claim 14, wherein each of the plurality of virtual processors is associated with a virtual machine.

20. The host machine of claim 19, wherein the virtual machine is associated with an identifier.

* * * * *